W. L. CARD.
Church.
No. 61,925.
Patented Feb. 12, 1867.
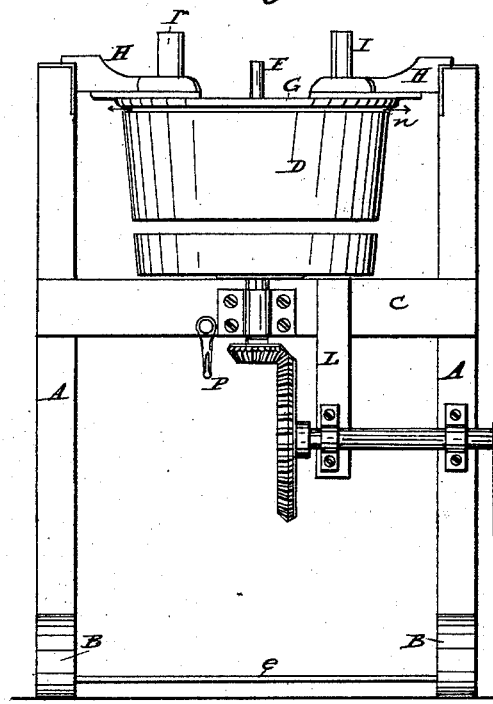
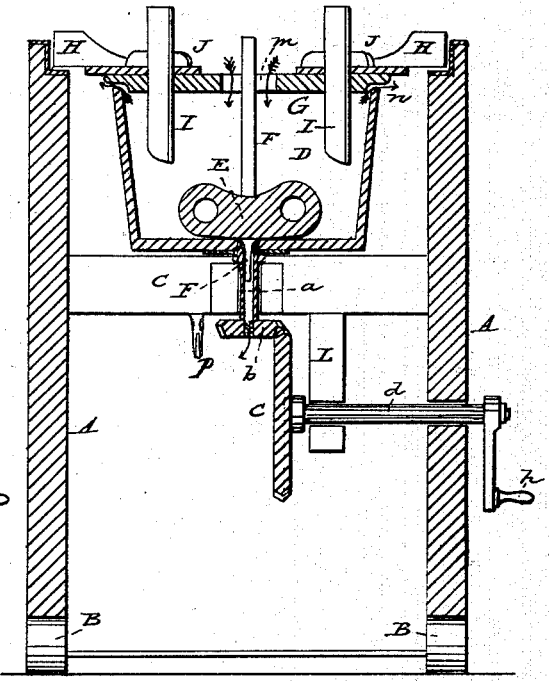
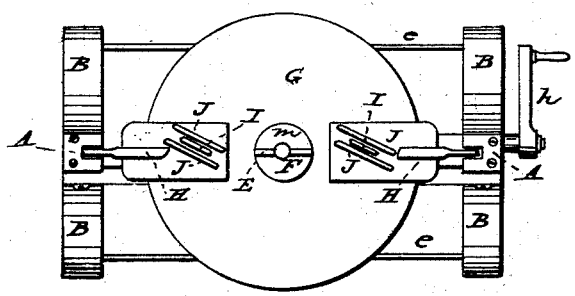
Witnesses:
J. W. Heuthel
E. C. Hennyr
Inventor:
William L. Card
by Coburn many

United States Patent Office.

WILLIAM L. CARD, OF GARDINER, ILLINOIS.

Letters Patent No. 61,925, dated February 12, 1867.

---

IMPROVEMENT IN CHURNS.

---

*The Schedule referred to in these Letters Patent and making part of the same.*

---

TO ALL WHOM IT MAY CONCERN:

Be it known that I, WILLIAM L. CARD, of Gardiner, in the county of Grundy, and State of Illinois, have invented a new and useful Improvement in Rotary Churns; and I do hereby declare and make known that the following is a full, clear, and exact description of the same, reference being had to the accompanying drawings, and to the letters and figures marked thereon, which form part of this specification.

My said invention consists in so arranging a vertical churn that a rotary motion may be given thereto, so that the centrifugal force induced by said rotary motion throws the cream outward to the periphery of the churn, where it strikes against stationary arms so constructed or arranged as to throw said cream back to the centre of the churn, thus insuring a violent and thorough agitation thereof; and in the employment, in combination with said revolving churn, of a removable dasher, to aid the action of said centrifugal force in carrying or throwing the cream outward if desired, and which, when removed, leaves an outlet through the bottom of the churn, through which the butter-milk, or water used in cleansing the churn, may be drawn off when desired.

To enable others skilled in the art to understand how to construct and use my invention, I will proceed to describe the same with particularity, making reference in so doing to the aforesaid drawings, in which—

Figure 1 represents a side elevation of my invention.

Figure 2, a central vertical section thereof; and

Figure 3, a plan or top view of the same.

Similar letters of reference in the several figures denote the same parts of my invention.

A represents two vertical posts, on standards suitably and rigidly attached to the base supports B, as shown, C being a cross-bar, connecting the two posts A, its ends being firmly secured thereto in any suitable manner. D represents the churn, which is of a cylindrical form, having a tube, $a$, fixed in the bottom thereof, at the centre, which passes down through a suitable box or bearing in or upon the said cross-bar C, in which it has a free rotary motion, as hereinafter set forth. Upon the lower end of said tube or hollow shaft $a$, is arranged a bevel gear-wheel, marked $b$, which gears into a similar gear-wheel, $c$, upon the shaft $d$, having its bearings in L and A, as shown, so that by turning the crank or handle $h$, a rotary motion is imparted to the churn D, as desired, and before mentioned. G represents the cover of the churn, which has a central opening, as shown at $m$, and which is supported by means of the legs H attached thereto in suitable rests upon the top of said posts A A, so as to leave a small annular space at the top of the churn, as shown at $n$; or air outlets may be provided at said points in any other suitable manner. F represents a shaft, upon which a dasher, E, may be attached if desired, for the purposes hereinbefore mentioned, the lower end thereof being formed so as to enter the aforesaid hollow shaft or tube $a$, and fit closely therein, so as effectually to close said tube, and revolve with the churn. I I represent stationary arms projecting down into the churn, near the periphery thereof, in an inclined position, as shown, for the purposes hereinbefore mentioned, passing through appropriate slots in the cover G; J representing projections arranged upon each side of said slots, as shown, to facilitate the adjustment and keying of said arms in such position as may be desired, either to extend them down lower within the churn, or to raise them up.

The cream being put into the churn, the crank $h$ is turned with the required or proper rapidity, thereby imparting the requisite rotary motion to the churn, whereby the cream is thrown out to the periphery, the dasher E, if used, also aiding this movement of the cream. The cream is thus thrown against a series of one or more inclined arms, I, whose inclination tends to throw the cream back toward the centre of the churn, and this constant agitation back and forth soon converts the cream into butter. Furthermore, the agitation of the cream is greatly facilitated, and the butter produced much more rapidly by the constant passing through the same of a current of air from the centre to the periphery of the churn, passing in at $m$ and out at $n$, caused by the rotary motion of the churn, as before described. When the butter is formed, the butter-milk is drawn off through the hollow shaft $a$, upon removing the dash-shaft F, into a pail or bucket, which may be suspended upon the hook P for that purpose.

Having described the construction and operation of my invention, I will now specify what I claim, and desire to secure by Letters Patent:

I claim the combination of the revolving churn and stationary dashers, the hollow shaft $a$, and removable spindle F, arranged and operating as and for the purposes specified.

WM. L. CARD.

Witnesses:
H. J. EDMUNDS,
A. EDMUNDS,
J. C. CARD.